(12) United States Patent
Sundström

(10) Patent No.: US 8,347,054 B2
(45) Date of Patent: Jan. 1, 2013

(54) METHOD AND COMPUTER PROGRAM PRODUCT FOR MEMORY MANAGEMENT IN A MASS STORAGE DEVICE

(75) Inventor: Mikael Sundström, Lulea (SE)

(73) Assignee: Oricane AB, Lulea (SE)

( * ) Notice: Subject to any disclaimer, the term of this patent is extended or adjusted under 35 U.S.C. 154(b) by 288 days.

(21) Appl. No.: 12/746,087

(22) PCT Filed: Dec. 2, 2008

(86) PCT No.: PCT/SE2008/051392
§ 371 (c)(1),
(2), (4) Date: Jun. 3, 2010

(87) PCT Pub. No.: WO2009/072970
PCT Pub. Date: Jun. 11, 2009

(65) Prior Publication Data
US 2010/0257330 A1    Oct. 7, 2010

(30) Foreign Application Priority Data
Dec. 5, 2007  (SE) ........................... 0702750

(51) Int. Cl.
*G06F 12/00*  (2006.01)
(52) U.S. Cl. ................. 711/165; 711/E12.001
(58) Field of Classification Search .......... 711/165, 711/E12.002
See application file for complete search history.

(56) References Cited

U.S. PATENT DOCUMENTS

| | | | |
|---|---|---|---|
| 5,956,745 A | 9/1999 | Bradford et al. | |
| 6,070,172 A * | 5/2000 | Lowe ................................. | 1/1 |
| 6,757,801 B1 | 6/2004 | Best et al. | |

(Continued)

FOREIGN PATENT DOCUMENTS

| | | |
|---|---|---|
| EP | 0675442 | 10/1995 |
| KR | 2003/0061948 | 7/2003 |
| WO | 2007/081638 | 7/2007 |
| WO | 2007/118955 | 10/2007 |

OTHER PUBLICATIONS

International Search Report for corresponding application No. PCT/SE2008/051392 dated Mar. 3, 2009.

(Continued)

*Primary Examiner* — Charles Rones
*Assistant Examiner* — Mehdi Namazi
(74) *Attorney, Agent, or Firm* — Renner, Otto, Boisselle & Sklar, LLP

(57) ABSTRACT

A method for memory management in a mass storage device, comprising the steps of providing a managed memory area (stockling) of s blocks that can be moved and stored in two parts to prevent fragmentation; repeatedly moving each of stockpiles 1,2, . . . , i-1 one block to the right until all stockpiles to the right of stockpile i have moved si blocks, or the left part of the rightmost stockling to the end of the free area (without changing the order between the blocks); returning the contiguous si blocks area beginning where the rightmost stockling began before its leftmost part was moved; locating the rightmost stockling that is stored in one piece (it is either the rightmost stockling itself or the stockling to the left of the rightmost stockling) and moving it to the location of the stockling to be deallocated, and reversing the allocation procedure.

5 Claims, 1 Drawing Sheet

U.S. PATENT DOCUMENTS

2004/0098554 A1 5/2004 Fougerdux et al.
2004/0215913 A1 10/2004 Fougeroux et al.
2006/0195649 A1* 8/2006 Bayt .............................. 711/100
2007/0101091 A1 5/2007 Kaakani et al.
2008/0282057 A1* 11/2008 Layden et al. ................ 711/210

OTHER PUBLICATIONS

European Search Report for corresponding patent application EP 08 85 7080 dated Sep. 10, 2012.

* cited by examiner (a) insert 
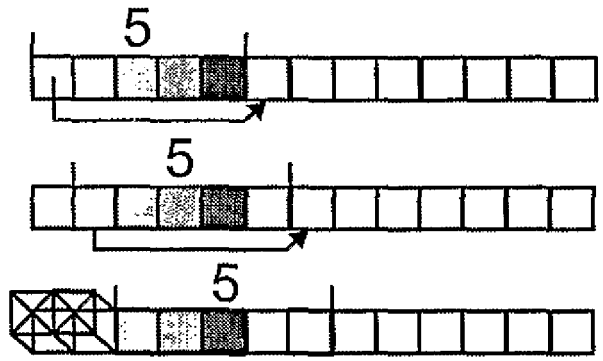
(b) insert 
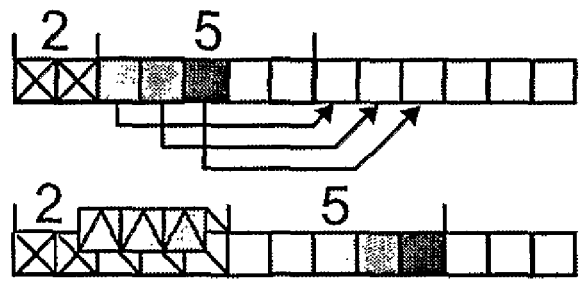
(c) delete 
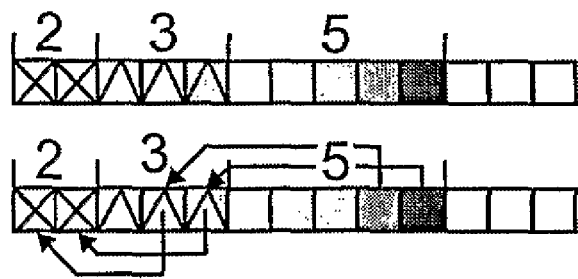
(d) insert 
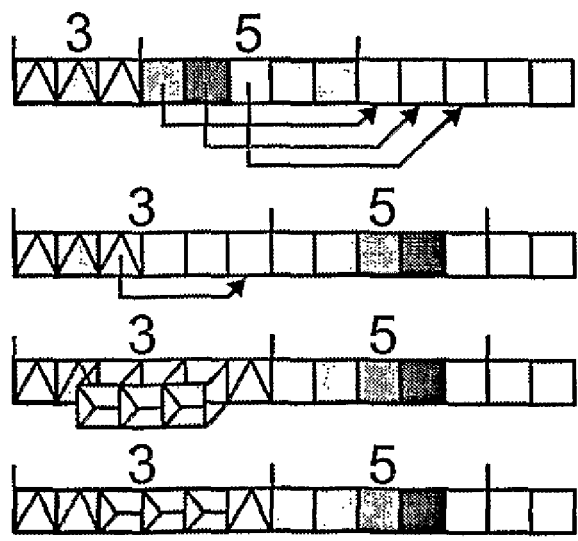

METHOD AND COMPUTER PROGRAM PRODUCT FOR MEMORY MANAGEMENT IN A MASS STORAGE DEVICE

This application is a national phase of International Application No. PCT/SE2008/051392 filed Dec. 2, 2008 and published in the English language.

TECHNICAL FIELD

The present invention relates to a method and computer program product for storing data in a mass storage device.

BACKGROUND

In a mass storage device, consider the general problem of allocating and deallocating memory areas, e.g. data files, of different sizes from the heap of available/used storage while maintaining zero fragmentation. By the term heap we mean the parts of the mass storage which is in use and occupied with data files. In general, allocating a contiguous memory area of size s blocks is straightforward—we simply let the heap grow by s blocks. Deallocation is however not so straightforward. Typically, we end up with a hole somewhere in the middle of the heap and a substantial reorganization effort is required to fill the hole. An alternative would be to relax the requirement that memory areas need to be contiguous. It will then be easier to create patches for the holes but it will be nearly impossible to use the memory areas for storing data structures etc.

Thus, there is a need of a memory management algorithm for a mass storage device which is something in between these two extremes.

SUMMARY OF THE INVENTION

The present invention aims to solve the problems discussed above such as to reduce the problem with memory management for files of different sizes in a mass storage device.

Herein, the term "mass storage device includes but is not limited to a server, in particular for the Internet, storage in data centers, server farms, community solutions (e.g. facebook).

According to a first embodiment of the present invention, this is provided by a method of the kind defined in the introductory portion of the description and having the characterizing features of claim 1. In the present invention the method comprises so-called "stock piling".

The method may also comprise a step of decreasing compression ratio.

The method could be used in a server.

According to a second aspect of the present invention a computer program product is provided, having computer program code means to make a computer execute the above method when the program is run on a computer.

It is appreciated that the computer program product is adapted to perform embodiments relating to the above described method, as is apparent from the attached set of dependent system claims.

Thus, the concept underlying the present invention is to provide a memory management algorithm comprising so-called stockpiling in a mass storage device.

The invention finds application for routing, forensic networking, fire-walling, qos-classification, traffic shaping, intrusion detection, IPSEC, MPLS, etc and as component in technologies to solve any one of the problems mentioned.

Additional features and advantages of the present invention are disclosed by the appended dependent claims.

BRIEF DESCRIPTION OF THE DRAWINGS

To further explain the invention embodiments chosen as examples will now be described in greater details with reference to the drawings of which:

FIG. 1 illustrates stockpiling.

DESCRIPTION OF EMBODIMENTS OF THE INVENTION

Now is referred to FIG. 1 illustrating an embodiment of the present invention including the concept of "stockpiling".

A mass storage device contains files of different sizes. By size, we mean how many disk- or memory blocks are required to store the file and we consider files using the same cardinal number of blocks to be of the same size. That is, two files that requires 5.1 and 6 blocks are both considered to be of size 6 respectively.

Our goal is to store all files consecutively on the mass storage device so that the reading/writing device does not need to "jump" between different locations when a file is read/written. Instead, it just reads/writes the "next" block repeatedly until the job is done. However, as a first step, we will describe a method where all files of the same size, except one, are stored consecutively. We will then describe how to modify the method such that all files are stored consecutively.

Theretofore, we will now assume that any file can be stored in two parts, but not more than two consecutive parts. Also, in the following description we will use the term memory access to mean reading or writing of one block.

A so-called "stockling" is a managed memory area of s blocks (i.e. b bits blocks) that can be moved and stored in two parts to prevent fragmentation. Our approach is to use a stockling to store each data file in the mass storage device. It is associated with information about its size s, whether or not the area is divided in two parts and the location and size of the respective parts. Moreover, each stockling must be associated with an address to a pointer to the data structure stored in the stockling so it can be updated when the stockling is moved. Finally, it is associated with a (possibly empty) procedure for encoding the location and size of the second part and the size of the first part in the first block. Let ns be the number of stocklings of size s. These stocklings are stored in, or actually constitutes a, stockpile which is a contiguous sns blocks memory area. A stockpile can be moved one block to the left by moving one block from the left side of the stockpile to the right side of the stockpile (the information stored in the block in the leftmost block is moved to a free block at the right of the rightmost block). Moving a stockpile one block to the right is achieved by moving the rightmost block to the left side of the stockpile. The rightmost stockling in a stockpile is possibly stored in two parts while all other stocklings are contiguous. If it is stored in two parts, the left part of the stockling is stored in the right end of the stockpile and the right end of the stockling at the left end of the stockpile.

Assume that we have c different sizes of stocklings s1, s2, ..., sc where $s_i > s_{i+1}$. We organize the memory so that the stockpiles are stored in sorted order by increasing size in the growth direction. Furthermore, assume without loss of generality that the growth direction is to the right. Allocating and deallocating a stockling of size si from stockpile i is achieved as follows:

Allocate si.

Repeatedly move each of stockpiles 1, 2, ..., i−1 one block to the right until all stockpiles to the right of stockpile i have moved si blocks. We now have a free area of si blocks at the right of stockpile i. If the rightmost stockling of stockpile i is stored in one piece, return the free area. Otherwise, move the left part of the rightmost stockling to the end of the free area (without changing the order between the blocks). Then return the contiguous si blocks area beginning where the rightmost stockling began before its leftmost part was moved. Deallocate si.

Locate the rightmost stockling that is stored in one piece (it is either the rightmost stockling itself or the stockling to the left of the rightmost stockling) and move it to the location of the stockling to be deallocated. Then reverse the allocation procedure.

In FIG. 1, we illustrate the stockpiling technique in the context of insertion and deletion of structures of size 2 and 3 in a managed memory area with stockling sizes 2, 3 and 5. Each structure consists of a number of blocks and these are illustrated by squares with a shade of grey and a symbol. The shade is used to distinguish between blocks within a structure and the symbol is used to distinguish between blocks from different structures. We start with a 5-structure and then in (a) we insert a 2-structure after allocating a 2-stockling. Observe that the 5-structure is stored in two parts with the left part starting at the 6th block and the right part at the 3rd block. In (b) we allocate and insert 3 blocks and as a result, the 5-structure is restored into one piece. A straightforward deletion of the 2-structure is performed in (c) resulting in that both remaining structures are stored in two parts. Finally, in (d) a new 3-structure is inserted. This requires that we first move the 5-structure 3 blocks to the right. Then, the left part (only the white block in this case) of the old 3-structure is moved next to the 5-structure and finally the new 3-structure can be inserted. The cost for allocating an si stockling and inserting a corresponding structure is computed as follows. First, we have to spend $(i-1) \cdot si$ memory accesses for moving the other stockpiles to create the free space at the end of the stockpile. We then have two cases: (i) Insert the data structure directly into the free area. The cost for this is zero memory accesses since we have already accessed the free area when moving the stockpiles (insertion can be done simultaneously while moving the stockpiles). (ii) We need move the leftmost part of the rightmost stockling. However, it occupies an area which will be overwritten when inserting the data structure. Therefore, we get an additional si memory accesses for inserting the data structure. For deallocation, we get an additional cost of si memory accesses since we may need to overwrite the deleted stockling somewhere in the middle of the stockpile. We also need to account for the cost for updating pointers to the data structures that are moved. Since the stockpiles are organized by increasing size, at most one pointer needs to be updated for each stockpile moved plus two extra pointer updates in the current stockpile. It follows that the cost for inserting a si blocks data structure when using stockpile memory management is $i \cdot si + (i-1) + 2 = i \cdot si + i + 1$ memory accesses and the cost for deletion is $(i+1) \cdot si + (i-1) + 2 = (i+1) \cdot si + i + 1$ memory accesses.

According to another embodiment of the present invention, stockpiling can be used also if it is not possible to store data structures in two parts. In each stockpile, we have a dummy stockling and ensure that it is always the dummy stocklings that are stored in two parts after reorganization.

By using stockpiling we can limit the cost for insertion and deletion of an ai-block structure to at most $i \cdot ai + i + 1$ memory accesses and $(i+1) \cdot ai + i + 1$ memory accesses, respectively, where $a1 > a2 > \ldots > ak$ are the different allocation units available. as an example, consider a case where the maximum allocation unit (data file size) is s (7, 128)=364 blocks and assuming that we require maximum compression, we must use 364 different allocation units. As a result, $ai = 364 - (i-1)$ and the worst-case cost for inserting an $a182 = 364 - (182-1) = 183$-block structure is 33489 memory accesses. To reduce the memory management overhead we must reduce the number of allocation units. This is achieved by decreasing the compression ratio. When using vertical segmentation, we waste 128 bits in each leaf in the upper part for storing pointers and some additional information that is required when using Stockpiling. By using these bits we can also store the variables k, r, and l required for running the maintenance of each block tree in the lower part in-place. The total cost for this is $162 \cdot 128 = 20736$ bits which is amortized over 91935 intervals yielding a negligible overhead per interval. Hence, the maximum relative size is roughly 144 bits per intervals also with vertical segmentation. Suppose that we increase storage by a factor of C, for some constant $C > 1$. We can then allocate (and use) 364 blocks even if we only need A blocks, provided that $AC \geq 364$. Furthermore, we can skip all allocation units between A−1 and 364. By applying this repeatedly, we obtain a reduced set of allocation units where $ai = \text{ceil}(a1/C^{(i-1)})$. To further demonstrate this, we choose C=2, which corresponds to a 100% size increase, and perform a thorough worst-case analysis of the update cost. The first step is to compute the set of allocation units and the insertion and deletion cost for each allocation unit (see Table 9). Before investigating the worst-case update cost, we observe that $364 + 730 = 1094$ memory accesses is a lower bound on the update cost which is independent of C. This is a result from simply reconstructing one 364-block structure without involving the memory manager and simultaneously deallocating the other 364-block structure at a cost of 730 memory accesses. For our particular choice of C, an additional 367 memory accesses for allocating a 182-block structure must be added to the lower bound resulting in an actual lower bound of 1461 memory accesses. In the worst-case, an insertion of one allocation unit and a deletion of another is required for both block trees. However, not all combinations of insertion and deletion costs are possible. The first observation is that deleting of one allocation unit is followed by inserting the next smaller or the next larger allocation unit. We can also exclude the combinations where the size of the deleted allocation unit from one block tree is the same as the inserted allocation unit from the other block tree as this eliminates one deallocation cost. By comparing costs for the remaining combinations in the table above, we find that the worst-case occurs when deleting a 364-block and a 91-block structure and inserting two 182-block structures resulting in a total cost of $730 + 368 + 2 \cdot 367 = 1832$ memory accesses. Adding the single memory access required for updating the upper part yields a total worst-case incremental update cost of 1833 memory accesses for a 100% size increase. To provide a better understanding of the possible trade-offs between compression ratio and guaranteed update costs we have performed these computations for various values of C and the result are presented in Table 10. These figures should be compared with 134322 memory accesses which is the update cost obtained for C=1. Also note that for $C \geq 3.31$, the worst-case update cost equals the general lower bound computed above plus the cost for allocating an a2-blocks structure.

TABLE 9

Insertion and deletion costs for the different allocation units obtained for C = 2.

| i | 1 | 2 | 3 | 4 | 5 | 6 | 7 | 8 | 9 | 10 |
|---|---|---|---|---|---|---|---|---|---|---|
| $a_i$ | 364 | 182 | 91 | 46 | 23 | 12 | 6 | 3 | 2 | 1 |
| $icost_i$ | 366 | 367 | 277 | 189 | 121 | 79 | 50 | 33 | 28 | 21 |
| $dcost_i$ | 730 | 549 | 368 | 235 | 144 | 91 | 56 | 36 | 30 | 22 |

TABLE 10

Relation between storage and update costs.

| C | Worst-case update cost |
|---|---|
| 1.1 | 6537 |
| 1.25 | 3349 |
| 1.5 | 2361 |
| 1.75 | 2049 |
| 2 | 1833 |
| 2.5 | 1561 |
| 3 | 1393 |
| 4 | 1280 |

The present invention has been described by given examples and embodiments not intended to limit the invention to those. A person skilled in the art recognizes that the attached set of claims sets forth other advantage embodiments.

The invention claimed is:

1. A method for memory management in a mass storage device, said method comprising the steps of:
    providing at least one managed memory area of s blocks (wherein s is greater than zero) configured to be moved and stored in first and second parts to prevent fragmentation within the first and second parts, wherein the managed memory area (stockling) is associated with information about the size of the stockling which is the number s of blocks, whether or not the area is divided in two parts and the location and size of the respective parts;
    associating each stockling with an address to a pointer to a data structure stored in the stockling so it can be updated when the stockling is moved;
    associating the stockling with a, possibly empty, procedure for encoding the location and size of the second part and the size of the first part in the first block, wherein n*s is the number of stocklings of s blocks and n is the number of said at least one managed memory area;
    storing the stocklings in a stockpile which is a contiguous memory area, which stockpile can be moved one block to the left by moving one block from the left side of the stockpile to the right side of the stockpile (the information stored in the block in the leftmost block is moved to a free block at the right of the rightmost block),
    organizing the memory so that the stockpiles are stored in sorted order by increasing size in a growth direction,
    performing an allocation procedure by repeatedly moving each of stockpiles 1, 2, . . . , i–1 (wherein i is greater than zero) one block to the right until all stockpiles to the right of the $i^{th}$ stockpile have moved a number of blocks equal s*i, or the left part of the rightmost stockling to the end of the free area (without changing the order between the blocks);
    returning the contiguous s*i blocks area beginning where the rightmost stockling began before its leftmost part was moved;
    locating the rightmost stockling that is stored in one piece (it is either the rightmost stockling itself or the stockling to the left of the rightmost stockling) and moving it to the location of the stockling to be deallocated, and reversing the allocation procedure.

2. The method according to claim 1, further comprising a step of decreasing compression ratio.

3. The method according to claim 1, wherein a dummy stockling is provided and stored in two parts after reorganization.

4. The method according to claim 1, wherein the method is used in a server.

5. A computer program product comprising a nontransitory computer readable medium on which is stored computer program code that when executed on a computer causes the computer to perform the method of claim 1.

* * * * *

UNITED STATES PATENT AND TRADEMARK OFFICE
CERTIFICATE OF CORRECTION

PATENT NO. : 8,347,054 B2
APPLICATION NO. : 12/746087
DATED : January 1, 2013
INVENTOR(S) : Mikael Sundstrom It is certified that error appears in the above-identified patent and that said Letters Patent is hereby corrected as shown below:

In the Claims:
Claim 1 should read as follows:

1. A method for memory management in a mass storage device, said method comprising the steps of:
   -providing at least one stockling of s blocks (wherein s is greater than zero) configured to be moved and stored in first and second parts to prevent fragmentation, wherein each stockling is associated with information about the size of the stockling which is the number s of blocks in the stockling, whether or not the stockling is divided in two parts, and the location and size of the respective parts;
   -associating each stockling with an address to a pointer to a data structure stored in the stockling so the address can be updated when the stockling is moved;
   -associating the stockling with a procedure for encoding the location and size of the second part and the size of the first part in the first block, wherein ns is the number of stocklings of s blocks;
   -storing the at least one stockling in a stockpile which is a contiguous memory area, which stockpile can be moved one block to the left by moving one block from the left side of the stockpile to a free block at the right of a rightmost block;
   -organizing the mass storage device so that a plurality of stockpiles are stored in sorted order by increasing size in a growth direction;
   -performing an allocation procedure by
      -repeatedly moving each of stockpiles 1, 2, . . . , i -1 (wherein i is greater than zero) one block to the right until all stockpiles to the right of the ith stockpile have moved a number of blocks equal to s*i to produce a free area at the right of stockpile i to produce a free area at the right of stockpile i;
      -moving the leftmost part of the rightmost stockling to the end of the free area to produce a contiguous area;
      -returning the contiguous area beginning where the rightmost stockling began before its leftmost part was moved; and
   -performing a deallocation procedure by Signed and Sealed this
Twenty-first Day of May, 2013

Teresa Stanek Rea
*Acting Director of the United States Patent and Trademark Office*

-locating the rightmost stockling that is stored in one piece and moving the rightmost stockling that is stored in one piece to the location of a stockling to be deallocated, and reversing the allocation procedure.

UNITED STATES PATENT AND TRADEMARK OFFICE
CERTIFICATE OF CORRECTION

PATENT NO. : 8,347,054 B2
APPLICATION NO. : 12/746087
DATED : January 1, 2013
INVENTOR(S) : Mikael Sundstrom It is certified that error appears in the above-identified patent and that said Letters Patent is hereby corrected as shown below:

In the Claims:
Column 5, line 31 - Column 6, line 29, Claim 1 should read as follows:

1. A method for memory management in a mass storage device, said method comprising the steps of:
  -providing at least one stockling of s blocks (wherein s is greater than zero) configured to be moved and stored in first and second parts to prevent fragmentation, wherein each stockling is associated with information about the size of the stockling which is the number s of blocks in the stockling, whether or not the stockling is divided in two parts, and the location and size of the respective parts;
  -associating each stockling with an address to a pointer to a data structure stored in the stockling so the address can be updated when the stockling is moved;
  -associating the stockling with a procedure for encoding the location and size of the second part and the size of the first part in the first block, wherein ns is the number of stocklings of s blocks;
  -storing the at least one stockling in a stockpile which is a contiguous memory area, which stockpile can be moved one block to the left by moving one block from the left side of the stockpile to a free block at the right of a rightmost block;
  -organizing the mass storage device so that a plurality of stockpiles are stored in sorted order by increasing size in a growth direction;
  -performing an allocation procedure by
    -repeatedly moving each of stockpiles 1, 2, . . . , i -1 (wherein i is greater than zero) one block to the right until all stockpiles to the right of the ith stockpile have moved a number of blocks equal to s*i to produce a free area at the right of stockpile i to produce a free area at the right of stockpile i;
    -moving the leftmost part of the rightmost stockling to the end of the free area to produce a contiguous area;
    -returning the contiguous area beginning where the rightmost stockling began before its leftmost part was moved; and This certificate supersedes the Certificate of Correction issued May 21, 2013.

Signed and Sealed this
Eleventh Day of June, 2013

Teresa Stanek Rea
*Acting Director of the United States Patent and Trademark Office*

-performing a deallocation procedure by
- locating the rightmost stockling that is stored in one piece and moving the rightmost stockling that is stored in one piece to the location of a stockling to be deallocated, and reversing the allocation procedure.